United States Patent
Vergottini

(10) Patent No.: US 12,118,293 B2
(45) Date of Patent: Oct. 15, 2024

(54) METHOD FOR EXTENDING CHANGE MANAGEMENT IN AN XML DOCUMENT TO ALLOW FOR GROUPINGS AND NESTING OF CHANGES

(71) Applicant: Xcential Corporation, Encinitas, CA (US)

(72) Inventor: Grant Vergottini, San Marcos, CA (US)

(73) Assignee: XCENTIAL CORPORATION, Encinitas, CA (US)

( * ) Notice: Subject to any disclaimer, the term of this patent is extended or adjusted under 35 U.S.C. 154(b) by 0 days.

(21) Appl. No.: 16/507,855

(22) Filed: Jul. 10, 2019

(65) Prior Publication Data

US 2020/0019593 A1 Jan. 16, 2020

Related U.S. Application Data

(60) Provisional application No. 62/696,566, filed on Jul. 11, 2018.

(51) Int. Cl.
*G06F 40/14* (2020.01)
*G06F 40/169* (2020.01)
*G06F 40/197* (2020.01)

(52) U.S. Cl.
CPC ............ *G06F 40/14* (2020.01); *G06F 40/169* (2020.01); *G06F 40/197* (2020.01)

(58) Field of Classification Search
CPC ....... G06F 40/197; G06F 40/14; G06F 40/169
See application file for complete search history.

(56) References Cited

U.S. PATENT DOCUMENTS

| | | | | |
|---|---|---|---|---|
| 5,574,898 | A * | 11/1996 | Leblang | G06F 11/3476 |
| 2005/0234931 | A1* | 10/2005 | Yip | H04L 41/5054 |
| 2006/0218160 | A1* | 9/2006 | Bhatia | G06F 40/197 |
| 2007/0061382 | A1 | 3/2007 | Davis et al. | |
| 2007/0268057 | A1* | 11/2007 | Gopal | H04L 67/1095 327/295 |
| 2009/0006949 | A1* | 1/2009 | Takeuchi | G06F 21/10 715/255 |
| 2011/0071859 | A1* | 3/2011 | Keefer | G06Q 40/08 705/4 |
| 2013/0018873 | A1 | 1/2013 | Velasco | |
| 2014/0013209 | A1* | 1/2014 | Good | G06F 40/154 715/235 |

(Continued)

OTHER PUBLICATIONS

International Search Report and Written Opinion for PCT/US2019/041207 dated Oct. 30, 2019.

(Continued)

*Primary Examiner* — Keith D Bloomquist
(74) *Attorney, Agent, or Firm* — Joseph T. Miotke; Elizabeth L. Neal; DeWitt LLP

(57) ABSTRACT

The present invention provides more robust change management features to an XML document by allowing a user to interrelate changes. The system and method allow a user to group a set of changes together, nest a change within a group of changes, relate effectivity information about a change, and detect conflicting changes. This more robust change management feature will allow for greater collaboration, clarity, and efficiency in a workplace where many users may be working on a number of different areas in a document.

23 Claims, 14 Drawing Sheets

(56) References Cited

U.S. PATENT DOCUMENTS

2014/0281873 A1* 9/2014 Frew .................... G06F 40/197
                                                        715/229

OTHER PUBLICATIONS

International Preliminary Report on Patentability for PCT/US2019/041207 issued Jan. 21, 2021, from WIPO.
Petition to Institute Derivation and Exhibits for U.S. Appl. No. 17/018,233 dated Mar. 22, 2017.

* cited by examiner

| Info | Name | Show | Line | Color | Accept | Conflict |
|---|---|---|---|---|---|---|
| ... | First | ☑ | ☑ | Green ▶ | ☐ | ☐ |
| ... | Second | ☑ | ☑ | Blue ▶ | ☐ | ☐ |

300

1. Lorem ipsum dolor sit amet, no eam dicam graecis deserunt, natum delectus intellegam pro cu. In duo prima feugiat. Nonumy democritum adolescens cu sit, ex omnesque adolescens philosophia duo. Ex vim tale integre percipitur, ludus accusamus. Nibh volumus singulis vel eu.

2. Te quo option fabellas quaerendum. Ad tempor volutpat euripidis eos. Pro dicit putant ex. Ea per ullum probatus, dicta ancillae sapientem vel et, an probo inermis voluptatibus vis discere no vix.

3. Ea nam error signiferumque. Ne vix illum maluisset philosophia, pri alterum sensibus ea. Ut aeque tibique deterruisset pro. Mea laudem oporteat reprehendunt ne, no pro illum harum reformidans, qui iisque maiestatis consectetuer an, justo nostro fastidii ne vel.

4. Et has impetus ancillae. Duis regione epicuri his ut, pri id nostrud laoreet verterem. Eos meis delenit quaerendum et, an novum graeci antiopam vix, eleifend torquatos no vis. Munere intellegat constituam ut per, tale legimus admodum at eam. Ut vel sint sapientem suavitate.

Fig. 3b

| Info | Name | Show | Line | Color | Accept | Conflict |
|------|------|------|------|-------|--------|----------|
| ... | First | Y | N | Green ▶ | ☐ | ☐ |
| ... | Second | Y | N | Blue ▶ | ☐ | ☐ |

300

1. Lorem ipsum dolor sit amet, no eam dicam graecis deserunt, natum delectus intellegam pro cu. In duo prima feugiat. Nonumy democritum adolescens cu sit, ex omnesque adolescens philosophia duo. Ex vim tale integre percipitur, qui ve pri te. Nibh volumus singulis vel eu.

2. Te quo option fabellas quaerendum. Ad tempor volutpat euripidis eos. Pro dicit putant ex. Ea per ullum probatus, dicta ancillae sapientem vel et, an probo inermis voluptatibus vis. Malis audiant.

3. Et justo soleat regione per, sit eu hinc gubergren. Ea nam error signiferumque. Ne vix illum maluisset philosophia, pri alterum sensibus ea. Ut aeque tibique deterruisset pro. Mea laudem oporteat reprehendunt ne, no pro illum harum reformidans, gui isque maiestatis consectetuer an. Natum tamquam quo in, Natum tamquam quo in justo nostro fastidii ne vel.

4. Et has impetus ancillae. Duis regione epicuri his ut, pri id nostrud laoreet verterem. Eos meis delenit quaerendum et, an novum graeci antiopam vix, eleifend torquatos no vis. Munere intellegat constituam ut per, tale legimus admodum at eam. Ut vel sint sapientem suavitate.

Fig. 3c

| Info | Name | Show | Line | Color | Accept | Conflict |
|------|------|------|------|-------|--------|----------|
| ... | First | N | N | Green ▶ | ☐ | ☐ |
| ... | Second | Y | Y | Blue ▽ | ☐ | ☐ |

Pink
Yellow
Green
Blue
Violet
Gray

304

300

1. Lorem ipsum dolor sit amet, no eam dicam graecis deserunt, natum delectus intellegam pro cu. In duo prima feugiat. Nonumy democritum adolescens cu sit, ex omnesque adolescens philosophia duo. Ex vim tale integre percipitur, ludus accusamus qui vel Nibh volumus singulis vel eu.

2. Te quo option fabellas quaerendum. Ad tempor volutpat euripidis eos. Pro dicit putant ex. Ea per ullum probatus, dicta ancillae sapientem vel et, an probo inermis voluptatibus vis. Malis audiam discere no vix.

3. Et justo soleat regione per, sit eu hinc gubergren. Ea nam error signiferumque. Ne vix illum maluisset philosophia, pri alterum sensibus ea. Ut aeque tibique deterruisset pro. Mea laudem oporteat reprehendunt ne, no pro illum harum reformidans, qui iisque maiestatis consectetuer an. Natum tamquam quo in, justo nostro fastidii ne vel.

4. Et has impetus ancillae. Duis regione epicuri his ut, pri id nostrud laoreet verterem. Eos meis delenit quaerendum et, an novum graeci antiopam vix, eleifend torquatos no vis. Munere intellegat constituam ut per, tale legimus admodum at eam. Ut vel sint sapientem suavitate.

Fig. 3d

| Info | Name | Show | Line | Color | Accept | Conflict |
|---|---|---|---|---|---|---|
| ... | First | Y | Y | Green ▶ | ☐ | ☐ |
| ... | Second | N | N | Pink ▶ | ☐ | ☐ |

1. Lorem ipsum dolor sit amet, no eam dicam graecis deserunt, natum delectus intellegam pro cu. In duo prima feugiat. Nonumy democritum adolescens cu sit, ex omnesque adolescens philosophia duo. Ex vim tale integre percipitur, ~~ludus accusamus pri te~~. Nibh volumus singulis vel eu.

2. Te quo option fabellas quaerendum. Ad tempor volutpat euripidis eos. Pro dicit putant ex. Ea per ullum probatus, dicta ancillae sapientem vel et, an probo inermis voluptatibus vis discere no vix.

3. Ea nam error signiferumque. Ne vix illum maluisset philosophia, pri alterum sensibus ea. Ut aeque tibique deterruisset pro. Mea laudem oporteat reprehendunt ne, no pro illum harum reformidans, qui iisque maiestatis consectetuer an Natum tamquam quo in, justo nostro fastidii ne vel.

4. Et has impetus ancillae. Duis regione epicuri his ut, pri id nostrud laoreet verterem. Eos meis delenit quaerendum et, an novum graeci antiopam vix, eleifend torquatos no vis. Munere intellegat constituam ut per, tale legimus admodum at eam. Ut vel sint sapientem suavitate.

Fig. 3e

| Info | Name | Show Line | Color | Accept | Conflict |
|---|---|---|---|---|---|
| ... | First | Y | Green ▶ | ☐ | ☐ |
| ... | Second | Y | Pink ▶ | ☐ | ☐ |
| ... | Third | Y | Gray ▶ | ☐ | ☐ |

300

1. Lorem ipsum dolor sit amet, no eam dicam graecis deserunt, natum delectus intellegam pro cu. In duo prima feugiat. Nonumy democritum adolescens cu sit, ex omnesque adolescens philosophia duo. Ex vim tale integre percipitur, ~~ludus accusamus qui vel ludus accusamus pri te~~. Nibh volumus singulis vel eu.

2. Te quo option fabellas quaerendum. Ad tempor volutpat euripidis eos. Pro dicit putant ex. Ea per ullum probatus, dicta ancillae sapientem vel et an probo inermis voluptatibus vis. Malis audiam discere no vix.

3. Et justo soleat regione per, sit eu hinc gubergren. Ea nam error signiferumque. Ne vix illum maluisset philosophia, pri alterum sensibus ea. Ut aeque tibique deterruisset pro. Mea laudem oporteat reprehendunt ne, no pro illum harum reformidans, qui iisque maiestatis consectetuer an. Natum tamquam quo in, Natum tamquam quo in, justo nostro fastidii ne vel.

4. ~~Et has impetus ancillae. Duis regione epicuri his ut, pri id nostrud laoreet veterem. Eos meis delenit quaerendum et, an novum graeci antiopam vix, eleifend torquatos no vis. Munere intellegat constituam ut per, tale legimus admodum at eam. Ut vel sint sapientem suavitate.~~

Fig. 3f

| Info | Name | Show | Line | Color | Accept | Conflict |
|---|---|---|---|---|---|---|
| ... | First | Y | Y | Green ▶ | N | ☐ |
| ... | Second | Y | Y | Pink ▶ | ☐ | ☐ |
| ... | Third | Y | Y | Gray ▶ | Y | ☐ |

300

1. Lorem ipsum dolor sit amet, no eam dicam graecis deserunt, natum delectus intellegam pro cu. In duo prima feugiat. Nonumy democritum adolescens cu sit, ex omnesque adolescens philosophia duo. Ex vim tale integre percipitur, ~~ludus accusamus qui ve~~ Nibh volumus singulis vel eu.

2. Te quo option fabellas quaerendum. Ad tempor volutpat euripidis eos. Pro dicit putant ex. Ea per ullum probatus, dicta ancillae sapientem vel et, an probo inermis voluptatibus vis. Malis audiam ~~discere ne vix.~~

3. Et justo soleat regione per, sit eu hinc gubergren. Ea nam error signiferumque. Ne vix illum maluisset philosophia, pri alterum sensibus ea. Ut aeque tibique deterruisset pro. Mea laudem oporteat reprehendunt ne, no pro illum harum reformidans, qui iisque maiestatis consectetuer an. Natum tamquam quo in, justo nostro fastidii ne vel.

METHOD FOR EXTENDING CHANGE MANAGEMENT IN AN XML DOCUMENT TO ALLOW FOR GROUPINGS AND NESTING OF CHANGES

CROSS-REFERENCE TO RELATED APPLICATIONS

This application claims the benefit of prior-filed, U.S. Provisional Patent Application No. 62/696,566, filed on Jul. 11, 2018, the contents of which are incorporated herein by reference in their entirety.

BACKGROUND OF THE INVENTION

The present disclosure is directed to a method for expanding the functionality of an XML document, specifically a method enhancing the ability to formally propose and review changes in an XML document which allows for grouping changes, nesting changes and incorporating metadata such as change provenance and effectivity instructions.

XML-based formats have become the default for many office-productivity tools. These office-productivity tools are typically rich in formatting and editing features to enable users to create extremely complex documents, charts, tables, graphs, etc. One of the complex editing features that many XML-based formats have incorporated is an ability to track changes to a document. Implementing track changes features in XML-based formats is a complex process. Since there is not a standardized change-tracking capability in XML document formats, each format must create the capability for that particular format. Traditional track changes features that can be seen in several XML-based formats would be tracking insertion, deletion, and formatting changes. Some formats even allow for tracking the changes of several different users separately. Users are then able to interact with the tracked changes by reviewing them one at a time. The user can typically accept the change, reject the change, or make further edits, which will be tracked.

These features are an asset to any XML-based document format; however, in many industries a more robust set of change management features are desired. By way of example, in legislative and regulatory drafting, multiple parties may propose amendments and updates to numerous laws and regulations. The documents submitted need to be error free, properly attributed, and updated at the proper time. At the same time, users require the ability to trace the original wording, determine what changes are passed, record the origin of each change, and record when they are enacted to take effect. Amendments to laws can include documents that are hundreds of pages long and may have several different types of amendments that have different effective dates. Many changes are related to other changes in the documents; however, traditional methods for tracking changes have no features to interrelate the changes.

There is an unmet need in the art for a more robust set of change management features for an XML document that allows a user to group changes by origin. There is a further unmet need in the art for an XML document that allows a user to record and distinguish "editorial" changes (changes made by the user incorporating the change) from changes that are incorporated by other means.

SUMMARY

One embodiment of the present invention is a method for extending change management within an XML document. The method comprises displaying existing changes to the XML document within at least one current change set using a graphical user interface, receiving and recording at least one change to the document within the current change set, and receiving and recording user input accepting and/or rejecting changes individually and/or as a group of all changes within the current change set. The at least one current change set is a metadata row in a metadata table. The metadata row comprises the at least one change and at least one metadata quality. The metadata table comprises a single XML processing instruction that is placed ahead of the XML document.

Another embodiment of the present invention is a system for extending change management within an XML document comprising a processor and a non-transitory computer readable medium programmed with computer readable code that upon execution by the processor causes the processor to execute the above method for extending change management within an XML document.

Another embodiment of the present invention is a non-transitory computer readable medium programmed with computer readable code that upon execution by a processor causes the processor to execute the above method for extending change management within an XML document.

Another embodiment of the present invention is an article of manufacture comprising a computer readable medium having stored thereon a data structure, a first field containing data representing an XML document, a second field containing data representing at least one change to the XML document, and a third field containing data representing at least one metadata quality.

Another embodiment of the present invention is a method of extending change management within an XML document in a system having a graphical user interface, a display, and an input device. The method comprises retrieving a document data structure, displaying a document representation with a change set representation on the display, receiving an input change to the XML document or a metadata table through the input device, modifying the change set representation based on the input change and the metadata table, modifying at least one metadata row of the metadata table based on the input change. The document representation is based on the XML document. The change set representation is based on the metadata table.

BRIEF DESCRIPTION OF THE DRAWING(S)

FIGS. 3a, 3b, 3c, 3d, 3e, 3f, 3g, and 3h depict an exemplary embodiment of a graphic user interface for a method of extending change management in an XML document.

Figure 4A:
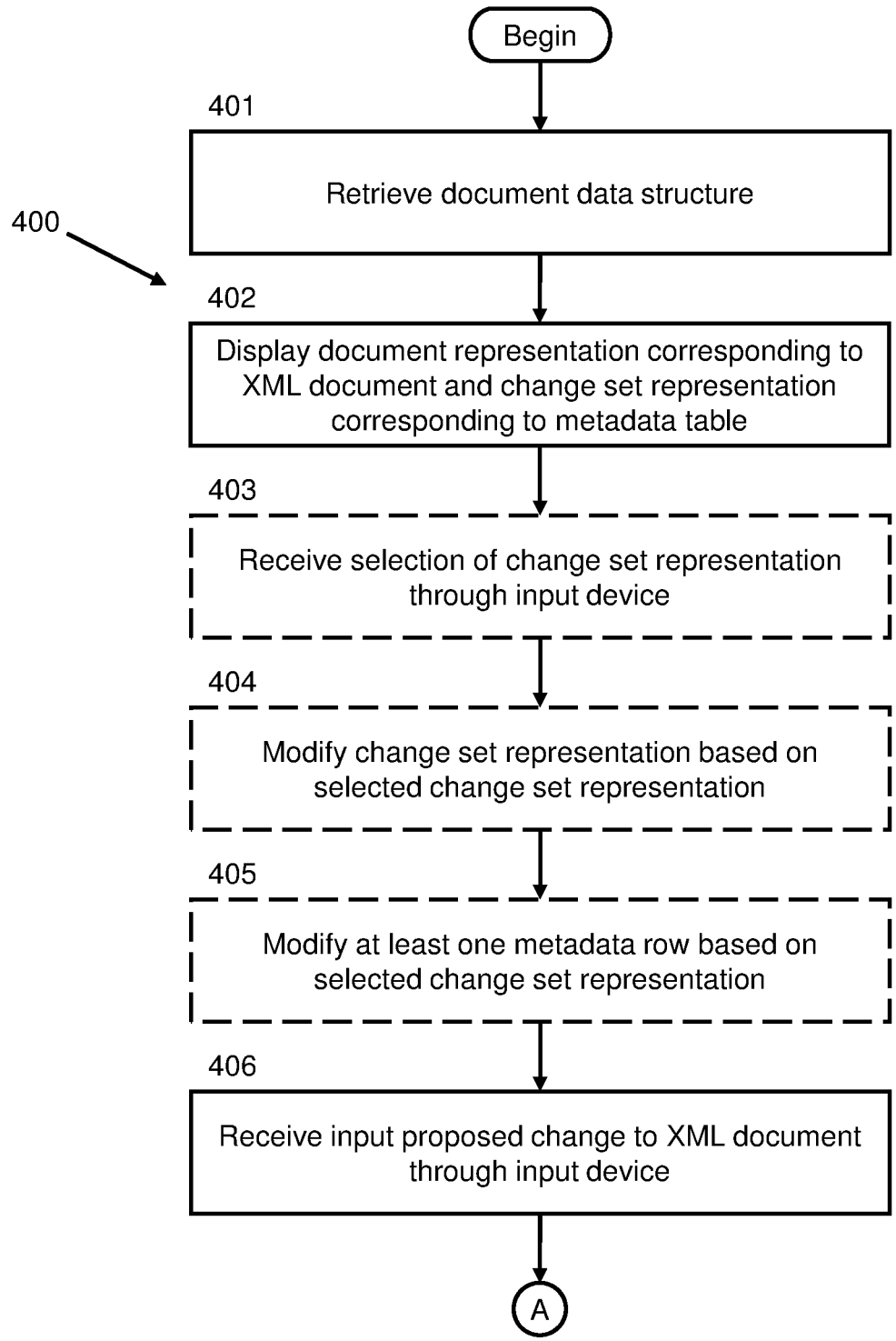
Figure 4B:
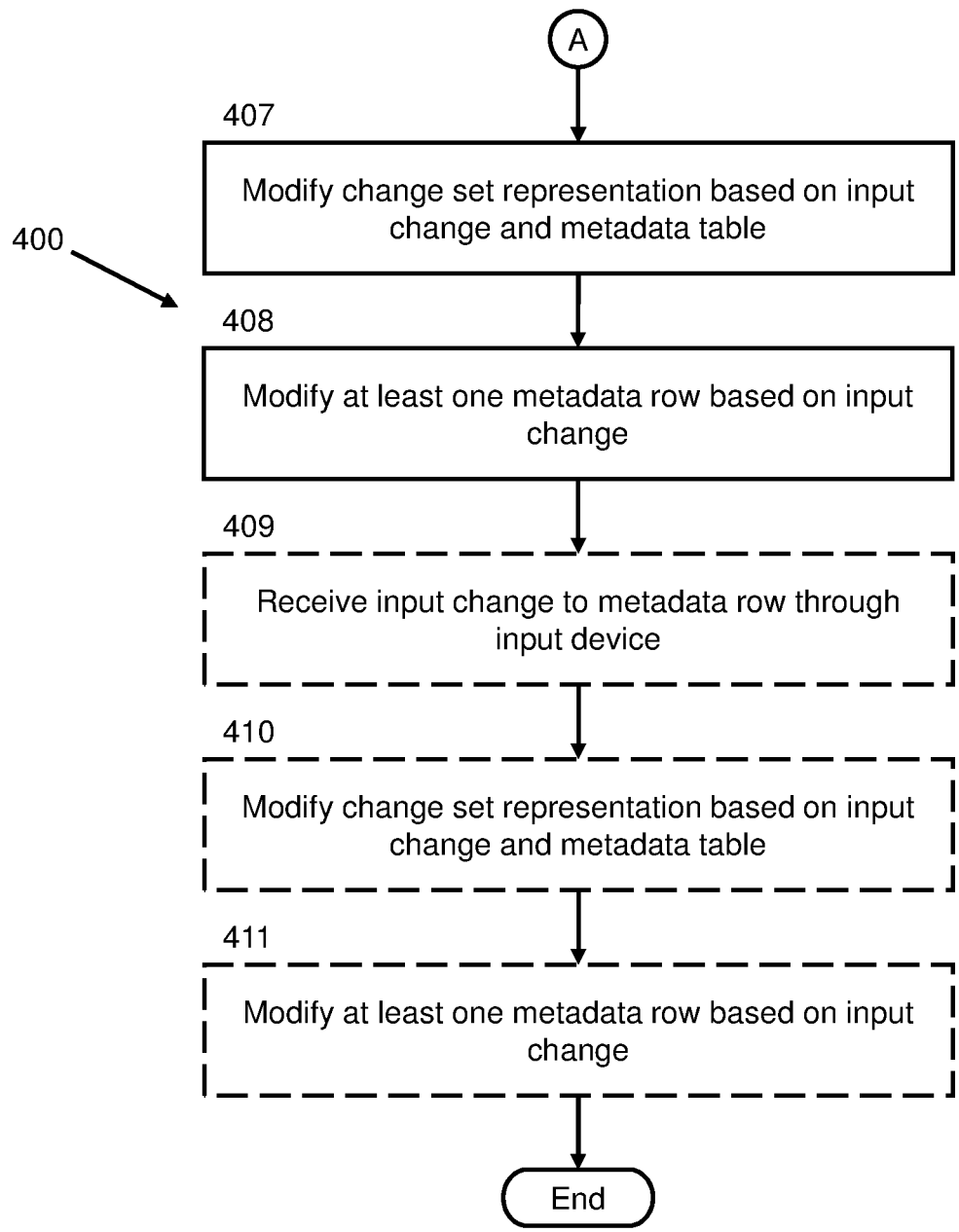

FIGS. 4a and 4b depict a flowchart of an exemplary embodiment of a method for using the graphic user interface for a method of extending change management in an XML document.

Figure 5:
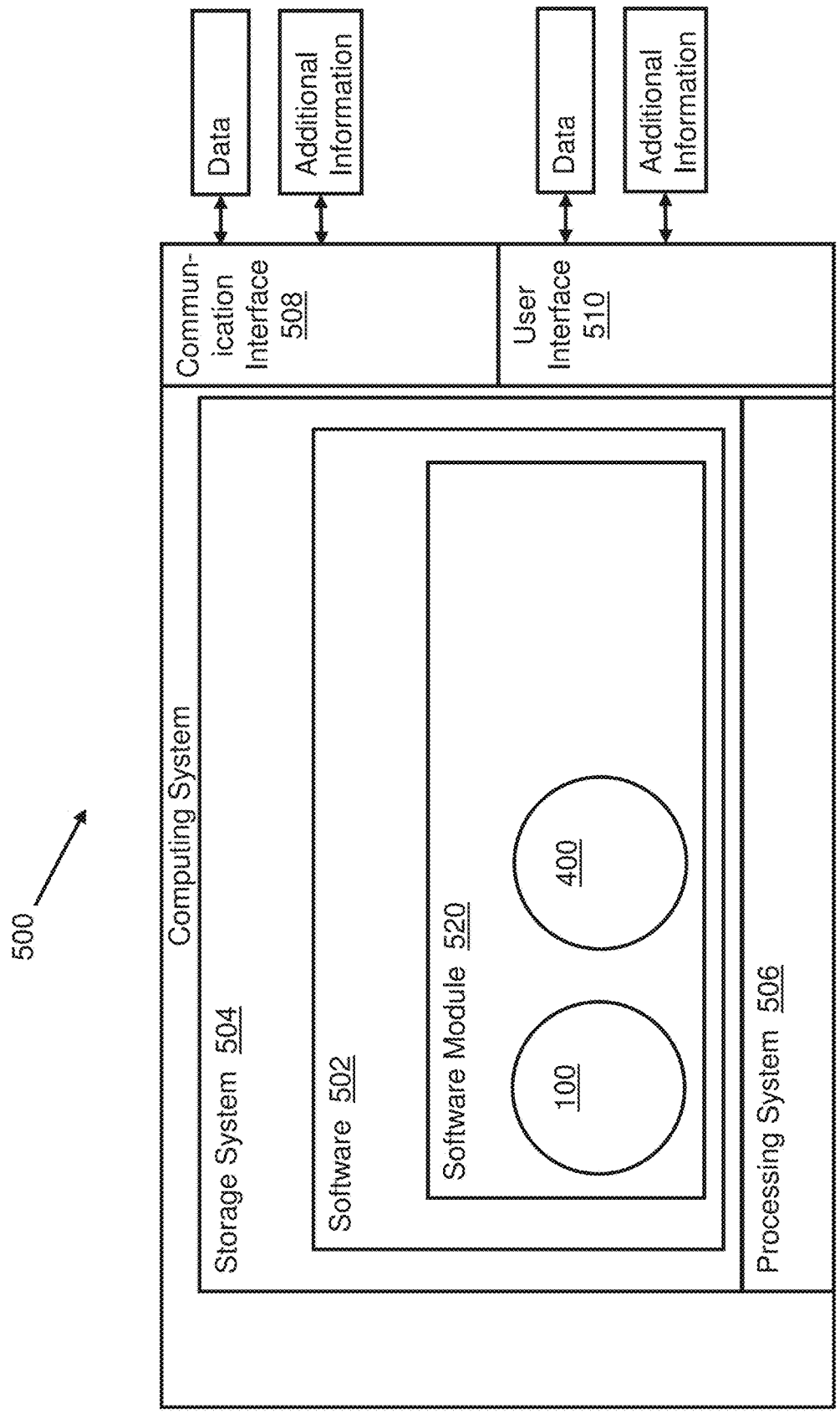

FIG. 5 depicts an exemplary embodiment of a system for implementing a method of extending change management in an XML document.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Dimensions and materials identified in the drawings and applications are by way of example only and are not intended to limit the scope of the claimed invention. Any other dimensions and materials not consistent with the purpose of the present application can also be used. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

The present invention overcomes shortcomings of traditional change tracking by providing a user with the ability to interrelate the changes managed in a document by allowing a user to create a set of changes that are grouped together, to nest grouped changes within other grouped changes, and to store information associated with the change group, such as the originating document, or effective or repeal dates; in addition, the system can identify conflicting changes. These features create a more robust change management capability in an XML document and will help promote collaboration, transparency, and efficiency in the work environment.

More specifically, the system will allow management of changes resulting from complex, multi-layered, multi-sourced processes. The system will also permit well-defined, deliberate management of extensive proposed changes, some of which may be enacted at a significant interval from the date at which the changes were proposed. For example, in the legislative and regulatory drafting industry, a coordinated work flow is needed and transparency mandates must be followed. The extended change management features will improve the legislative and regulatory workflow including improving transparency by more clearly describing when, what, and how changes to laws and regulations are to be made.

The present invention includes a method 100 to extend change management within XML documents to allow changes (recorded as insertions and deletions) to be grouped together in order to support a variety of functions that require relationships among the changes to be understood. The method 100 utilizes a document data structure 200, a graphic user interface (GUI) 300, and a system 500. The application of the method 100 is threefold:

1. To support editing tasks which require very precise and controlled edits to a document where the provenance of all changes must be established and any edits must be reviewed thoroughly before they can be incorporated into the document or into documents referred to by the source document. Provenance can include formal changes established by a legal process or informal changes made using the editorial powers of the legal staff.
2. To provide a mechanism to organize the temporal state of the document 200—recording all changes with effectivity information to establish applicability of the changes at points-in-time.
3. To relate different sets of changes together in order to identify and resolve conflicting changes.

Features of the method 100 allowing extension of change management in an XML document include:

1. Storage in XML metadata—A grouping of changes is called a change set. All such groupings are stored within the document as metadata. Each change set has arbitrary attributes which can classify the change set, relate it to other documents, and control the display/appearance of the change set, among other things.
2. Recordation of changes within a change set—Normally tracked changes (insertions and deletions) are recorded within changes sets. Opening or closing a change set controls the target change set to be used to record document edits. Changes can be accepted/rejected individually (as with normal track changes) or accepted/rejected as a group (all changes within a change set).
3. Arbitrary numbers of changes within change sets—Each change can contain 1 or more changes and/or other change sets.
4. Varying appearance distinguishing change sets—Change sets can be made visually distinct from one another by controlling presentation aspects such as, but not limited to, background color or font color.
5. Nested change sets—Change sets can nest within one another. By way of non-limiting example, an insertion made within a user's edit session can include a set of changes extracted as a set from another document. By way of another non-limiting example, multiple proposed variants for the same base document may be easily compared to determine how a change may propagate differently between the variants.
6. Recursively nested change sets—Changes can be recursive, allowing one change set to include another change set which can subsequently include changes from the first change.
7. Reference to other documents in change sets—Changes can refer to or cite other documents, usually to establish the provenance of the change.
8. Information storage in change sets—The effective or repeal date of a change can establish the period that a change is to be considered effective or part of the document. Change sets can also store any other arbitrary metadata. This can be used to record metadata such as, but not limited to, the process or procedure which produced the change (enacted law, editorial change, etc.), operational conditions which govern effectivity dates (i.e. in times of a national emergency).
9. Visibility modification of change sets—Changes within a change set can be visually shown or hidden. If a change set is hidden, all insertions are hidden while all deletions will reappear as if the changes had not taken been applied.
10. Identification of conflicting changes—Issues can be identified and resolved when different change sets make competing changes.

Figure 1A:
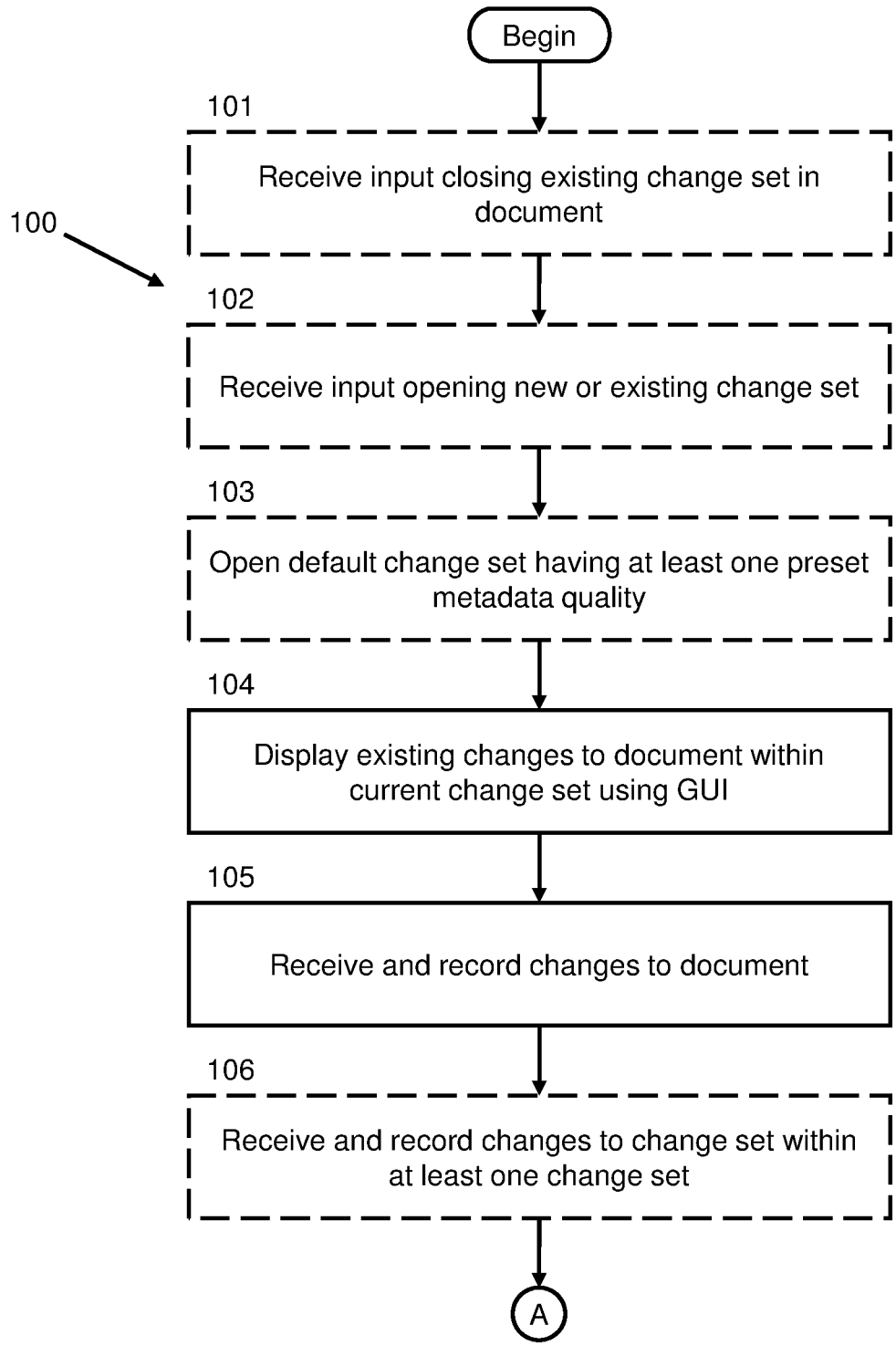
FIGS. 1a and 1b depict a flowchart of an exemplary embodiment of a method for extending change management in an XML document.
Figure 1B:
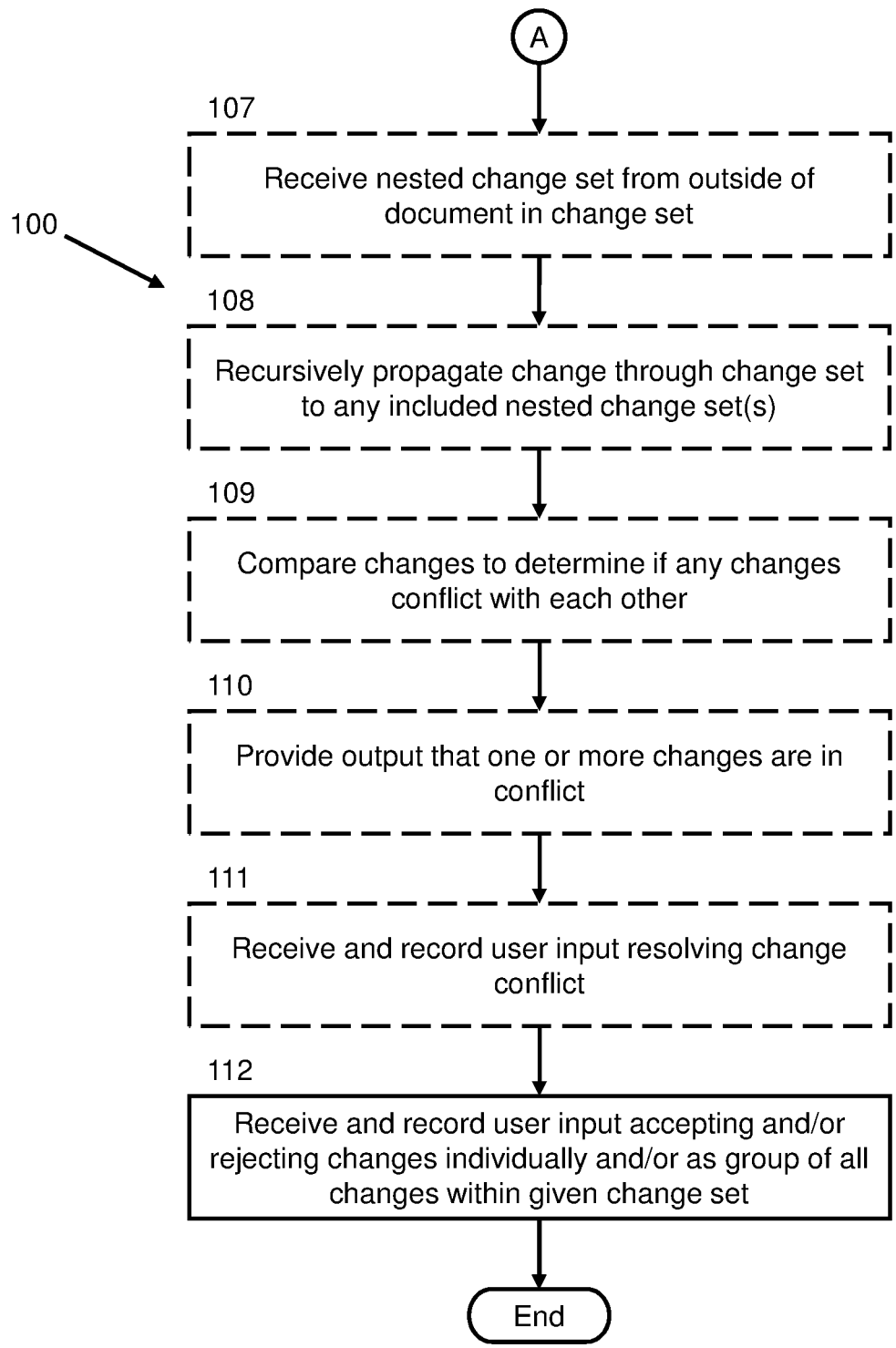

FIGS. 1a through 1b illustrate a flowchart of the method 100 for extending change management in an XML document.

In optional step 101, the system receives an input closing an existing change set in the document.

In optional step 102, the system receives an input opening a new or existing change set. The change set selected controls the target change set to be used to record document edits. This may result in nested changes.

In optional step 103, the system opens a default change set having at least one preset metadata quality. A default change set may be used automatically if no other change sets are associated with the document.

In step 104, the system displays existing changes to the document within the current change set using a GUI.

In step 105, changes to the document are received and recorded within at least one change set. Changes to the document may include normally managed changes, such as, but not limited to, insertions and deletions in the text of a document.

In optional step 106, changes to the change set itself are received and recorded within at least one change set. Changes to the change set may include alterations to the change set name, the visibility of changes, the indicia for marking changes, the origin of changes, the author of changes, the change effectivity, any presentation aspect of the change, addition or deletion of a document link, or any other arbitrary modification to the metadata.

In optional step 107, the change set receives a nested change set from outside of the document. For instance, an insertion made within a user's edit session can include a change set extracted from another document. The nested change set may itself include another nested change set or sets.

In optional step 108, the change recursively propagates through the change set to any included nested change set or sets.

In optional step 109, the system compares changes to determine if any changes conflict with each other.

In optional step 110, the system provides output that one or more changes are in conflict.

In optional step 111, the system receives and records user input resolving the change conflict.

In step 112, the system receives and records user input accepting and/or rejecting changes individually and/or as a group of all changes within the given change set.

Figure 2:
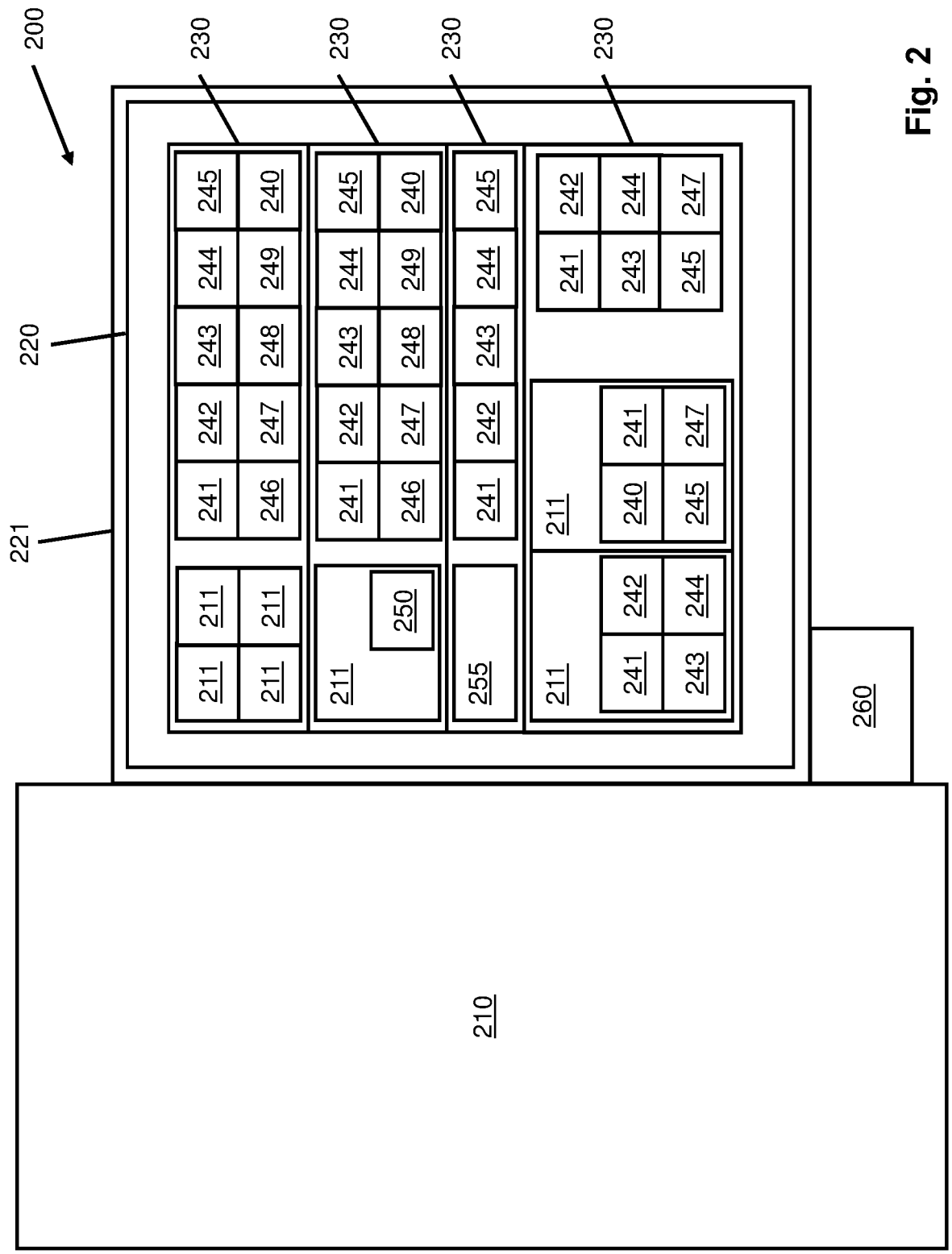
FIG. 2 depicts an exemplary embodiment of a document data structure used in the method for extending change management in an XML document.
Figure 3A:
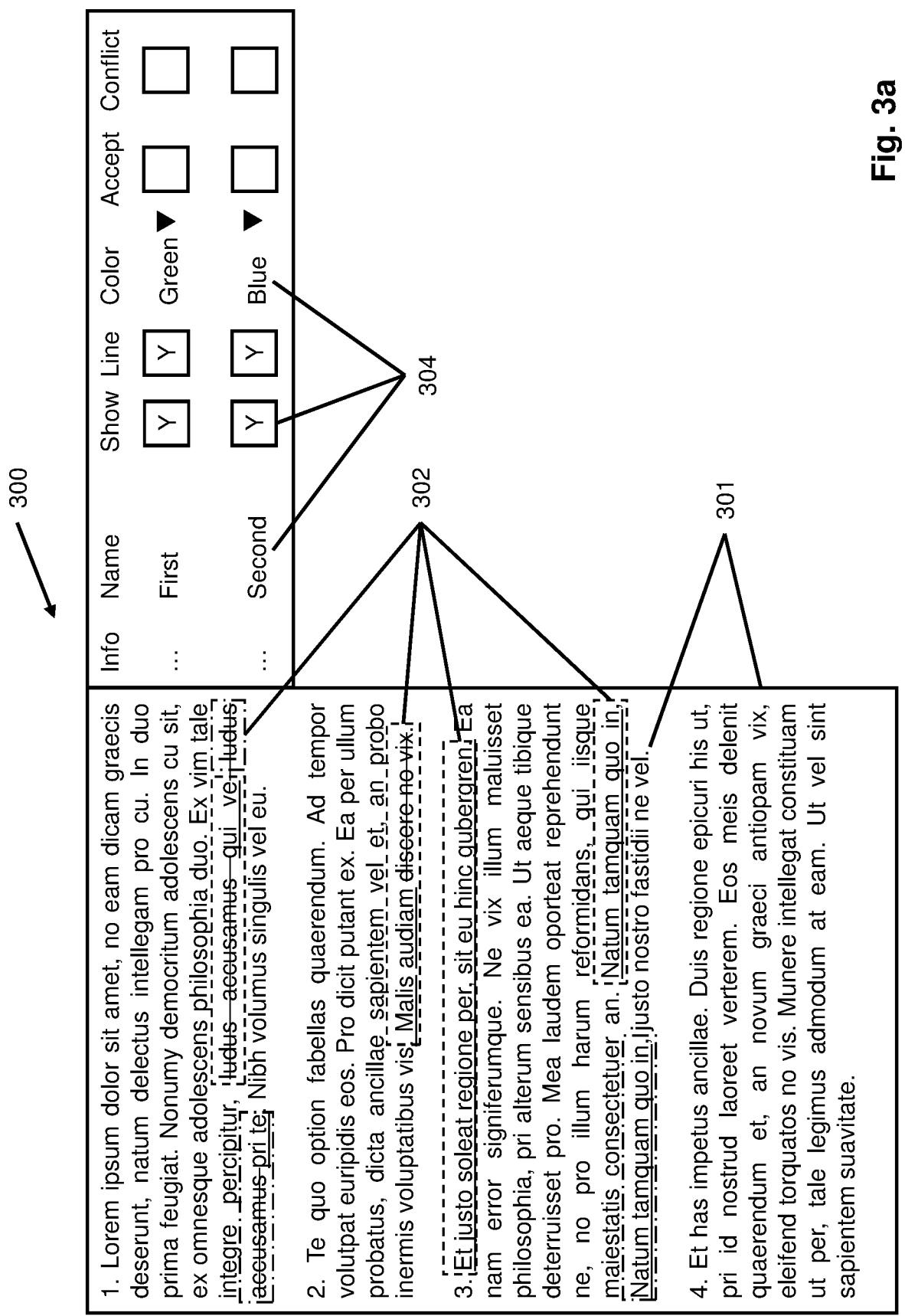
Figure 3G:
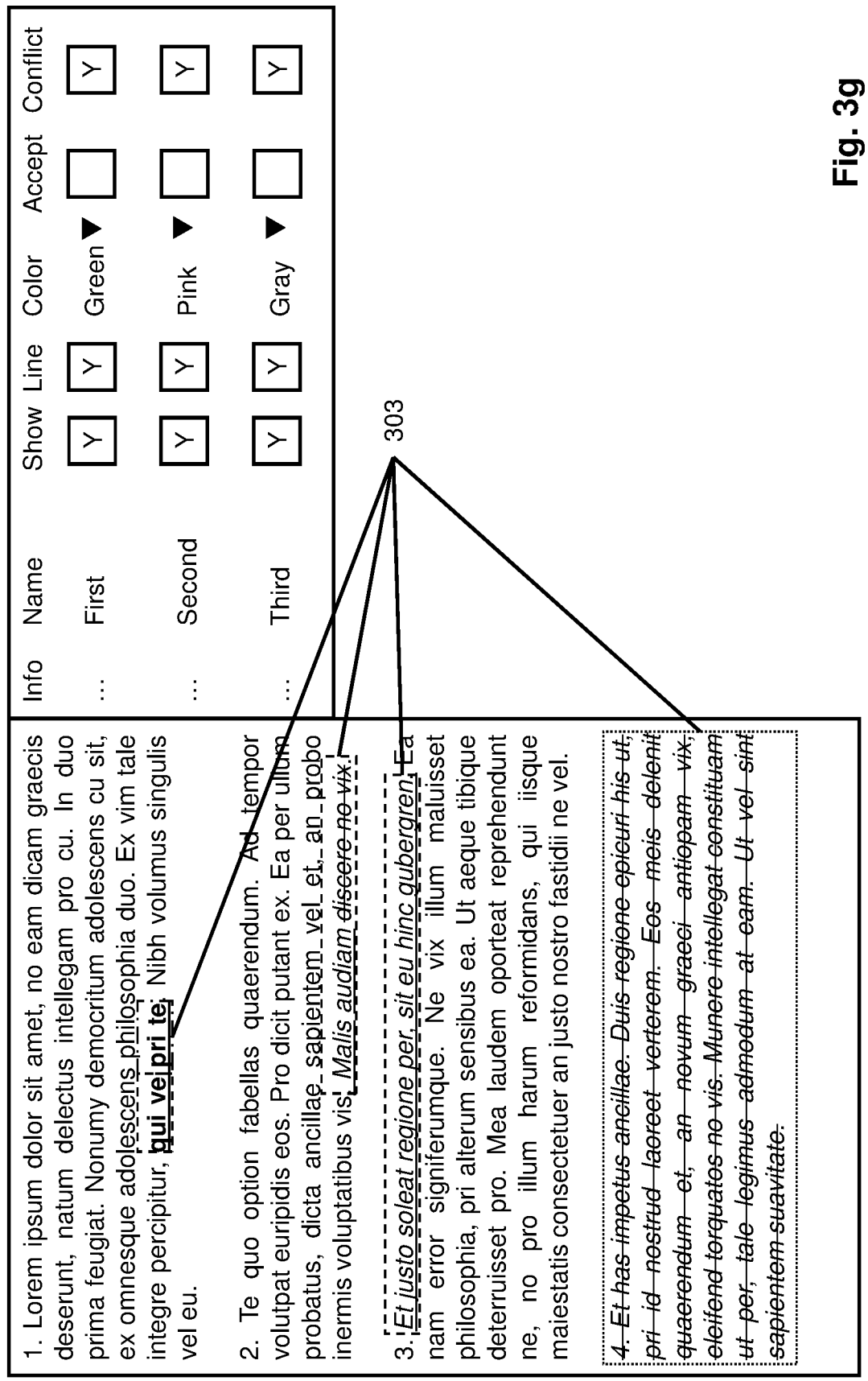

FIG. 2 shows a document data structure 200 used to record changes 211 to an XML document 210 during method 100. In an embodiment, the change set extension to record and manage changes 211 is implemented as a metadata table 220. Each metadata row 230 in the metadata table 220 records the changes 211 within a single change set; in essence, each metadata row 230 is a separate change set. Different change sets are represented by different metadata rows 230. Each metadata row 230 includes one or more changes 211 making up the change set.

Each metadata row 230 in the metadata table 220 also records at least one metadata quality 240, information about the change set in addition to the changes 211 themselves. Such metadata qualities 240 may include, by way of non-limiting example, the change set name 241, a change visibility 242 determining whether the associated changes are to be shown (when hidden, additions are hidden and deletions are re-revealed), change markings 243 determining whether the changes should be shown using change markings (by default, underline italic for insertions and strikethrough for deletions).

Additional metadata qualities 240 that may be desired can include, but are not limited to, a change origin 244 (usually a citation to the originating document), a change author 245 (identifying the user who made the change), a change effectivity status 246 (time and date when it comes into force and/or when it is repealed), any presentation aspect 247 of the change (the background and/or text color to use for the all changes associated with the change set), a document link 248 to another document, a change resolution 249 (whether a change is permanently or temporarily adopted, rejected, postponed, forwarded for debate, or any other determination), and any additional metadata qualities that may be added. It should be understood that this list is a non-limiting example of the types of information stored in the metadata table 220 and other embodiments using additional metadata qualities 240 are considered to be within the scope of the description. It should also be understood that the specific metadata qualities 240 shown within the document data structure 200 in FIG. 2 are exemplary only and that embodiments using any combination of existing or additional metadata qualities 240 are considered to be within the scope of the description.

When an XML document 210 is initially opened for modification, there may be no applicable change sets for a user to open and modify. In such circumstances, the user may use or be required to use a default change set 255 having at least one preset metadata quality 240. The default change set 255 may be used automatically if no other change sets are associated with the XML document 210, or may be selected manually by a user.

In certain embodiments, one change set may be nested within another change set. Such nested change sets 250 can be nested on multiple levels; by way of non-limiting example, a first change set is nested within a second change set, which is itself nested within a third change set. Such nested change sets 250 can be recursive, allowing modification of multiple change sets through input to a single change set. By way of non-limiting example, the change set can act as an isolation layer to separate editorial changes from original source material—which, as originally worded, might be enacted statutory law.

The individual managed changes 211 that are recorded to the document data structure 200 are associated with a specific change 211 to the XML document 210 by way of an attribute-level reference to metadata row 230 in the metadata table 220. Additional attribute-level metadata for an individual change 211 can be similar to the metadata stored in the metadata table 220. The values recorded for an individual change 211 take precedence over the metadata in the metadata table 220.

Ordinarily, an active change set is declared and all changes 211 that are recorded to the XML document 210 are associated to the active change set in metadata table 220. However, for the extension of change management features, the programmatic API allows a different change set to be recorded for a specific change 211. This mechanism allows a default change set 255 to be in effect recording user changes 211, while also recording the origin and effect of information being incorporated into the XML document 210 from other sources into other changes sets.

The metadata table 220 is encoded into a single XML processing instruction 221 that is placed ahead of the XML document 210. The processing instruction 221 allows the change set mechanism to be applied to any XML document without requiring the XML schema (or document type definition (DTD)) for that document to have any provisions for changes sets. The processing instruction 221 is decoded by an editor 260 for use and encoded whenever the document data structure 200 is saved.

FIGS. 3a through 3h illustrate the GUI 300 used with method 100. A document representation 301 displays the XML document 210. The change set representations 302 include visual indicia of the changes 211 previously proposed for the XML document 210 as recorded in the metadata table 220, as well as indicia communicating the differences between changes sets if multiple change sets are visible, such as, but not limited to change set name 241. The appearance of the change set representation 302 is determined by the change set record in the respective metadata row 230.

Metadata attributes 240 may also be shown in the GUI 300 as metadata representations 304, which allow users to view, select, and/or alter the metadata attributes 240, affecting the change set representation 302. The metadata representations 304 may not permit alteration of a metadata attributes 240, may allow direct input to alter the metadata attributes 240, or may be a representation of a drop-down menu or other predetermined set of selectable metadata attributes 240. By way of non-limiting example, multiple change set representations 302 may be visible on the same document representation 301 based on the change visibility 242 recorded in the metadata row 230. As seen in the non-limiting examples of FIGS. 3a through 3e, the user may modify the metadata row 230 using the GUI 300.

If changes 211 are in conflict, the GUI 300 may display a conflict representation 303 indicating which changes 211 conflict in each change set. The conflict representation 303 may include, by way of non-limiting example, a side-by-side comparison of conflicting changes or a difference in at least one metadata quality 240 while the conflict representation 303 is visible. Using the GUI 300, the user may select a change set representation 302 to view the applicable changes 211, hide the applicable changes 211, edit, reject, or accept the change set, or otherwise resolve the conflict between two change sets.

FIGS. 4a through 4b illustrate a flowchart of the GUI method 400.

In step 401, a processor retrieves the document data structure.

In step 402, the document representation corresponding to the XML document and the change set representation corresponding to the metadata table are displayed on a display. A non-limiting example of such document representation and change set representation in GUI 300 may be seen in FIG. 3a.

In optional step 403, the system receives a selection of a change set representation through an input device. Non-limiting examples of such selections in GUI 300 may be seen in FIGS. 3a through 3e.

In optional step 404, the system modifies the change set representation based on the selected change set representation. Non-limiting examples of such modifications in GUI 300 may be seen in FIGS. 3a through 3e.

In optional step 405, the system modifies at least one metadata row based on the selected change set representation.

In step 406, the system receives an input proposed change to the XML document through the input device. A non-limiting example of such input in GUI 300 may be seen in FIG. 3f.

In step 407, the system modifies the change set representation based on the input change and the metadata table.

In step 408, the system modifies at least one metadata row based on the input change.

In optional step 409, the system receives an input change to the metadata row through the input device. Non-limiting examples of such input in GUI 300 may be seen in FIGS. 3a-3e.

In optional step 410, the system modifies the change set representation based on the input change and the metadata table.

In optional step 411, the system modifies at least one metadata row based on the input change.

FIG. 5 depicts an exemplary embodiment of system 500 for implementing the extension of change management in an XML document to allow for groupings and nesting of changes.

The system 500 is generally a computing system that includes a processing system 506, a storage system 504, software 502, a communication interface 508, and a user interface 510. The processing system 506 loads and executes software 502 from the storage system 504, including a software module 520. When executed by the computing system 500, the software module 520 directs the processing system 506 to operate as described herein in further detail in accordance with the method 100 and/or the method 400.

The computing system 500 includes a software module 520 for performing the function of the extended change management features. Although the computing system 500 as depicted in FIG. 5 includes one software module 520 in the present non-limiting example, it should be understood that more modules could provide the same operation. Similarly, while the description as provided herein refers to a computing system 500 and a processing system 506, it is to be recognized that implementations of such systems can be performed using one or more processors, which may be communicatively connected, and such implementations are considered to be within the scope of the description. It is also contemplated that these components of the computing system 500 may be operating in a number of physical locations.

The processing system 506 can comprise a microprocessor and other circuitry that retrieves and executes the software 502 from the storage system 504. The processing system 506 can be implemented within a single processing device but can also be distributed across multiple processing devices or sub-systems that cooperate in existing program instructions. Non-limiting examples of processing systems 506 include general purpose central processing units, application specific processors, and logic devices, as well as any other type of processing device, combinations of processing devices, or variations thereof.

The storage system 504 can comprise any storage media readable by the processing system 506, and capable of storing the software 502. The storage system 504 can include volatile and non-volatile, removable and non-removable media implemented in any method or technology for storage of information, such as, but not limited to, computer readable instructions, data structures, program modules, or other data. The storage system 504 can be implemented as a single storage device but may also be implemented across multiple storage devices or subsystems. The storage system 504 can further include additional elements, such as, but not limited to, a controller capable of communicating with the processing system 506.

Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to the computing system 500.

The user interface 510 can include one or more desktops, monitors, terminals, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as, but not limited to, a video display or graphical display can display interfaces associated with embodiments of the system and method as disclosed herein, in particular the GUI 300. Speakers, printers, haptic devices and other types of output devices may also be included in the user interface 510. Users can communicate with the computing system 500 through the user interface 510.

As described in further detail herein, the computing system 500 receives and transmits data through the communication interface 508. In embodiments, the communication interface 508 operates to send and/or receive data to/from other devices and/or systems to which the computing system 500 is communicatively connected, and to receive and process user input, as described in greater detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. It is to be understood that this written description uses examples to disclose the invention, including the best mode, and also to enable any person skilled in the art to make anew the invention. The various embodiments of the systems, devices, and/or methods of the invention may be combined and recombined in any arrangement capable of the stated purpose of the invention. The different configurations, systems, and method steps described herein may be used alone or in combination with other configurations, systems and method steps. It is to be expected that various equivalents, alternatives and modifications are possible within the scope of the appended claims. The patentable scope of the invention may include other examples that occur to those skilled in the art.

The invention claimed is:

1. A method for management of change groupings within an XML document, the method comprising:
   receiving a user input and recording the user input as a plurality of individual changes within the XML document,
      wherein each of the plurality of individual changes represents a single insertion, deletion, or formatting alteration made by a user within the XML document,
      wherein the plurality of individual changes comprises a grouping of changes into at least one current change set,
      wherein the at least one current change set is a metadata row in a metadata table,
      wherein the metadata row comprises the plurality of individual changes and at least one metadata quality,
      wherein the metadata quality is selected from the group consisting of: at least one effectivity date of at least one change group, the process or procedure which produced at least one of the plurality of individual changes, and operational conditions which govern the at least one effectivity date, wherein the effectivity date is a date when at least one change group in the XML document comes into force or is repealed,
      wherein the metadata table comprises a single XML processing instruction that is placed ahead of the XML document; and
   displaying the XML document and the grouping of changes as visual indicia of each of the plurality of individual changes in the XML document using a graphical user interface;
   receiving and recording user input accepting or rejecting individual changes separately or as a group of all individual changes within the grouping of changes, wherein a user has the option of (a) accepting or rejecting individual changes separately and (b) accepting or rejecting the grouping of changes.

2. The method of claim 1, further comprising receiving an input closing an existing change set in the XML document.

3. The method of claim 1, further comprising receiving an input opening a new or existing change set in the XML document.

4. The method of claim 1, further comprising opening a default change set having at least one preset metadata quality.

5. The method of claim 1, further comprising receiving and recording a change to at least one change set metadata quality.

6. The method of claim 1, further comprising receiving and recording a nested change set from outside of the XML document.

7. The method of claim 6, further comprising recursively propagating an individual change within the nested change set.

8. The method of claim 1, further comprising comparing a first change set to a second change set to determine if any individual change from the first change set conflicts with any individual change from the second change set.

9. The method of claim 8, further comprising outputting any individual change from the first change set that conflicts with any individual change from the second change set.

10. The method of claim 9, further comprising receiving and recording a user input resolving the change conflict.

11. A system for management of change groupings within an XML document, comprising:
   a processor; and
   a non-transitory computer readable medium programmed with computer readable code that upon execution by the processor causes the processor to execute a method for extending change management within an XML document, the method comprising:
      receiving a user input and recording the user input as a plurality of individual changes within the XML document,
         wherein each of the plurality of individual changes represents a single insertion, deletion, or formatting alteration made by a user within the XML document,
         wherein the plurality of individual changes comprises a grouping of changes into at least one current change set,
         wherein the at least one current change set is a metadata row in a metadata table,
         wherein the metadata row comprises the plurality of individual changes and at least one metadata quality,
         wherein the metadata quality is selected from the group consisting of: at least one effectivity date of at least one change group, the process or procedure which produced at least one of the plurality of individual changes, and operational conditions which govern the at least one effectivity date, wherein the effectivity date is a date when at least one change group in the XML document comes into force or is repealed,
         wherein the metadata table comprises a single XML processing instruction that is placed ahead of the XML document; and
      displaying the XML document and the grouping of changes as visual indicia of each of the plurality of individual changes in the XML document using a graphical user interface;

receiving and recording user input accepting or rejecting individual changes separately or as a group of all individual changes within the grouping of changes, wherein a user has the option of (a) accepting or rejecting individual changes separately and (b) accepting or rejecting the grouping of changes.

12. The system of claim 11, further comprising a display showing the graphical user interface and an input device.

13. A non-transitory computer readable medium programmed with computer readable code that upon execution by a processor causes the processor to execute a method for extending change management within an XML document, the method comprising:

receiving a user input and recording the user input as a plurality of individual changes within the XML document,
  wherein each of the plurality of individual changes represents a single insertion, deletion, or formatting alteration made by a user within the XML document,
  wherein the plurality of individual changes comprises a grouping of changes into at least one current change set,
  wherein the at least one current change set is a metadata row in a metadata table,
  wherein the metadata row comprises the plurality of individual changes and at least one metadata quality,
  wherein the metadata quality is selected from the group consisting of: at least one effectivity date of at least one change group, the process or procedure which produced at least one of the plurality of individual changes, and operational conditions which govern the at least one effectivity date, wherein the effectivity date is a date when at least one change group in the XML document comes into force or is repealed,
  wherein the metadata table comprises a single XML processing instruction that is placed ahead of the XML document; and
displaying the XML document and the grouping of changes as visual indicia of each of the plurality of individual changes in the XML document using a graphical user interface;
receiving and recording user input accepting or rejecting individual changes separately or as a group of all individual changes within the grouping of changes, wherein a user has the option of (a) accepting or rejecting individual changes separately and (b) accepting or rejecting the grouping of changes.

14. An article of manufacture comprising:
a non-transitory computer readable medium having stored thereon a data structure;
a first field containing data representing an XML document;
a second field containing data representing at least one individual change to the XML document; and
a third field containing data representing at least one metadata quality,
wherein the second field and the third field are encoded into a single XML processing instruction,
wherein the metadata quality is selected from the group consisting of: at least one effectivity date of at least one change group, the process or procedure which produced at least one of the plurality of individual changes, and operational conditions which govern the at least one effectivity date, wherein the effectivity date is a date when at least one change group in the XML document comes into force or is repealed.

15. The article of claim 14, wherein the at least one metadata quality is selected from the group consisting of: change set name, visibility, change markings, origin, author, effectivity, presentation aspect, and document link.

16. The article of claim 14, further comprising a fourth field containing data representing at least one individual change to the XML document and at least one metadata quality directly and solely associated with the at least one change.

17. In a system having a graphical user interface, a display, and an input device, a method for management of change groupings within an XML document, the method comprising:

retrieving a document data structure;
displaying a document representation of the XML document and a grouping of changes within the XML document on the display,
  wherein the document representation is based on content of the XML document and includes visual indicia of each of a plurality of individual changes in the grouping of changes;
receiving a user input of at least one additional individual change to the XML document or a metadata table through the input device,
  wherein the at least one additional individual change represents a single insertion, deletion, or formatting alteration made by a user within the XML document;
modifying the grouping of changes based on the input at least one additional individual change and the metadata table; and
modifying at least one metadata row of the metadata table based on the at least one additional input individual change,
  wherein the at least one metadata row comprises the plurality of individual changes and at least one metadata quality,
  wherein the metadata quality is selected from the group consisting of: at least one effectivity date of at least one change group, the process or procedure which produced at least one of the plurality of individual changes, and operational conditions which govern the at least one effectivity date, wherein the effectivity date is a date when at least one change group in the XML document comes into force or is repealed.

18. The method of claim 17, further comprising receiving a selection of a change set representation through the input device.

19. The method of claim 18, further comprising modifying the change set representation based on the selected change set representation.

20. The method of claim 19, further comprising modifying at least one metadata row based on the selected change set representation.

21. The method of claim 17, further comprising receiving an input individual change to the metadata row through the input device.

22. The method of claim 21, further comprising modifying the change set representation based on the input individual change and the metadata table.

23. The method of claim 22, further comprising modifying at least one metadata row based on the input change.

* * * * *